(12) United States Patent
Chicoine et al.

(10) Patent No.: US 8,767,240 B1
(45) Date of Patent: Jul. 1, 2014

(54) METHOD AND APPARATUS FOR ENCODING DATA TO PERFORM REAL-TIME RENDERING

(75) Inventors: Scott Chicoine, Irvine, CA (US); Robert E. Romney, Irvine, CA (US)

(73) Assignee: Marvell International Ltd., Hamilton (BM)

( * ) Notice: Subject to any disclaimer, the term of this patent is extended or adjusted under 35 U.S.C. 154(b) by 190 days.

(21) Appl. No.: 13/359,785

(22) Filed: Jan. 27, 2012

Related U.S. Application Data

(60) Provisional application No. 61/437,208, filed on Jan. 28, 2011, provisional application No. 61/439,314, filed on Feb. 3, 2011.

(51) Int. Cl.
*G06F 3/12* (2006.01)
*G06K 15/00* (2006.01)
*G06F 15/00* (2006.01)
*G06K 1/00* (2006.01)

(52) U.S. Cl.
USPC ....... 358/1.15; 358/1.16; 358/1.17; 358/1.18; 358/1.9; 358/448

(58) Field of Classification Search
None
See application file for complete search history.

(56) References Cited

U.S. PATENT DOCUMENTS

| | | |
|---|---|---|
| 4,583,116 A | 4/1986 | Hennig et al. |
| 4,700,399 A | 10/1987 | Yoshida |
| 4,821,336 A | 4/1989 | Roye |
| 4,833,722 A | 5/1989 | Morton et al. |
| 5,113,249 A | 5/1992 | Yosefi |
| 5,131,058 A | 7/1992 | Ting et al. |
| 5,153,748 A | 10/1992 | Moyer |
| 5,204,918 A | 4/1993 | Hirosawa |
| 5,255,329 A | 10/1993 | Tanimizu et al. |
| 5,295,235 A | 3/1994 | Newman |
| 5,295,236 A | 3/1994 | Bjorge et al. |
| 5,313,570 A | 5/1994 | Dermer et al. |
| 5,386,483 A | 1/1995 | Shibazaki |
| 5,402,530 A | 3/1995 | Boenke et al. |
| 5,440,652 A | 8/1995 | Ting |
| 5,528,387 A | 6/1996 | Kelly et al. |
| 5,542,052 A | 7/1996 | Deutsch et al. |
| 5,581,667 A | 12/1996 | Bloomberg |
| 5,594,860 A | 1/1997 | Gauthier |
| 5,613,046 A | 3/1997 | Dermer |
| 5,625,703 A | 4/1997 | Okuda et al. |

(Continued)

FOREIGN PATENT DOCUMENTS

| | | |
|---|---|---|
| EP | 0531012 | 3/1993 |
| JP | 2001222396 | 8/2001 |

(Continued)

*Primary Examiner* — Satwant Singh (57) ABSTRACT

A system includes an input module configured to receive a data stream of encoded print data. The data stream includes image file data and a plurality of command operations, the encoded print data corresponds to a page of print data, and each of the command operations corresponds to at least one pixel in a line on the page of print data. An image file decoding module is configured to decode the image file data, store the decoded image file data in a first memory, and store, in the first memory, first identifiers identifying where the decoded image file data is stored. A print data decoding module is configured to receive the command operations and the identifiers, and generate decoded print data based on the command operations, the first identifiers, and the decoded image file data.

21 Claims, 3 Drawing Sheets

(56) References Cited

U.S. PATENT DOCUMENTS

| | | | |
|---|---|---|---|
| 5,634,089 A | 5/1997 | Kulbida et al. | |
| 5,638,498 A | 6/1997 | Tyler et al. | |
| 5,666,543 A | 9/1997 | Gartland | |
| 5,668,931 A | 9/1997 | Dermer | |
| 5,682,249 A | 10/1997 | Harrington et al. | |
| 5,684,895 A | 11/1997 | Harrington | |
| 5,687,303 A | 11/1997 | Motamed et al. | |
| 5,699,102 A | 12/1997 | Ng et al. | |
| 5,704,021 A | 12/1997 | Smith et al. | |
| 5,727,090 A | 3/1998 | Yellin | |
| 5,740,338 A | 4/1998 | Gauthier et al. | |
| 5,754,750 A | 5/1998 | Butterfield et al. | |
| 5,760,914 A | 6/1998 | Gauthier | |
| 5,796,930 A | 8/1998 | Gauthier et al. | |
| 5,805,174 A | 9/1998 | Ramchandran | |
| 5,835,640 A | 11/1998 | Clements | |
| 5,875,040 A | 2/1999 | Matraszek et al. | |
| 5,960,166 A | 9/1999 | Brown et al. | |
| 5,984,446 A | 11/1999 | Silverbrook | |
| 6,002,814 A * | 12/1999 | Chadez | 382/303 |
| 6,002,847 A | 12/1999 | Silverbrook | |
| 6,005,670 A | 12/1999 | Coleman | |
| 6,006,013 A | 12/1999 | Rumph et al. | |
| 6,014,133 A | 1/2000 | Yamakado et al. | |
| 6,046,818 A | 4/2000 | Benson | |
| 6,049,390 A | 4/2000 | Notredame et al. | |
| 6,081,608 A | 6/2000 | Fujii et al. | |
| 6,115,134 A * | 9/2000 | Creel et al. | 358/1.16 |
| 6,256,104 B1 | 7/2001 | Rumph et al. | |
| 6,280,105 B1 | 8/2001 | Lida | |
| 6,304,278 B1 | 10/2001 | Coleman | |
| 6,317,217 B1 | 11/2001 | Toda | |
| 6,327,043 B1 | 12/2001 | Rumph et al. | |
| 6,341,020 B1 | 1/2002 | Rumph et al. | |
| 6,429,948 B1 | 8/2002 | Rumph et al. | |
| 6,429,949 B1 | 8/2002 | Dziesietnik et al. | |
| 6,433,882 B1 | 8/2002 | Mori et al. | |
| 6,462,831 B1 | 10/2002 | Akiyama | |
| 6,476,931 B1 | 11/2002 | Aizikowitz et al. | |
| 6,529,633 B1 | 3/2003 | Easwar et al. | |
| 6,567,559 B1 | 5/2003 | Easwar | |
| 6,594,403 B1 | 7/2003 | Bozdagi et al. | |
| 6,621,586 B1 | 9/2003 | Kumar et al. | |
| 6,633,403 B1 | 10/2003 | Nonaka | |
| 6,647,151 B1 | 11/2003 | Stallbaumer et al. | |
| 6,665,081 B1 | 12/2003 | Suzuki et al. | |
| 6,671,064 B2 | 12/2003 | Rumph et al. | |
| 6,731,400 B1 | 5/2004 | Nakamura et al. | |
| 6,767,072 B1 | 7/2004 | Sato | |
| 6,785,208 B1 * | 8/2004 | Fujimoto et al. | 369/53.18 |
| 6,795,208 B1 | 9/2004 | Tanaka | |
| 8,179,548 B2 * | 5/2012 | Fukuda | 358/1.15 |
| 8,368,939 B2 * | 2/2013 | Hanamoto | 358/1.17 |
| 2001/0022659 A1 | 9/2001 | Arai | |
| 2001/0043345 A1 * | 11/2001 | Rumph et al. | 358/1.9 |
| 2002/0027666 A1 | 3/2002 | Ikeda | |
| 2002/0054313 A1 | 5/2002 | Shimizu | |
| 2002/0131059 A1 | 9/2002 | Tsuchitoi | |
| 2002/0154324 A1 | 10/2002 | Tay et al. | |
| 2003/0107766 A1 | 6/2003 | Ramot et al. | |
| 2003/0117637 A1 | 6/2003 | Coleman | |
| 2003/0117643 A1 | 6/2003 | Coleman | |
| 2003/0117644 A1 | 6/2003 | Coleman | |
| 2003/0121007 A1 | 6/2003 | Coleman | |
| 2004/0032617 A1 * | 2/2004 | Lapstun et al. | 358/1.15 |
| 2004/0120006 A1 * | 6/2004 | Kumar et al. | 358/1.16 |
| 2004/0120593 A1 * | 6/2004 | Earl et al. | 382/245 |
| 2004/0264786 A1 | 12/2004 | McElvain | |
| 2005/0219577 A1 | 10/2005 | Edge | |
| 2008/0027666 A1 * | 1/2008 | Schenkel et al. | 702/85 |

FOREIGN PATENT DOCUMENTS

| | | |
|---|---|---|
| JP | 2001270170 | 10/2001 |
| JP | 2001287413 | 10/2001 |
| WO | WO9843204 | 10/1998 |
| WO | WO9924933 | 5/1999 |
| WO | WO0022568 | 4/2000 |

* cited by examiner

METHOD AND APPARATUS FOR ENCODING DATA TO PERFORM REAL-TIME RENDERING

CROSS-REFERENCE TO RELATED APPLICATIONS

The present disclosure claims the benefit of U.S. Provisional Application No. 61/437,208, filed on Jan. 28, 2011 and U.S. Provisional Application No. 61/439,314, filed on Feb. 3, 2011. The disclosures of the applications referenced above are incorporated herein by reference.

This application is related to U.S. patent application Ser. No. 13/018,264 filed on Jan. 31, 2011 and U.S. Pat. No. 7,880,750, which are incorporated herein by reference.

FIELD

The present disclosure relates to rendering data for printing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An application executed by a host (e.g., a personal computer, tablet computer, or smartphone) may send one or more pages of image data to be printed by a printer. For example, the application provides the image data to a printer driver. The printer driver implements rendering software to encode (e.g., compress) the image data into raster data. The raster data may indicate location and attributes for each page element of a printed page. For example, the raster data may include position, color, and size. The raster data may indicate horizontal and vertical positions using a two-dimensional coordinate system (e.g., X, Y) and may indicate a sequential drawing order Z. For example, Y corresponds to a line on a page, and X corresponds to a particular pixel in the line Y.

The printer receives the encoded image data (i.e, the raster data) from the host, decodes the encoded image data, and prints a page corresponding to the image data. For example, the printer may include one or more processors that execute firmware stored in memory and communicate with a decoder.

SUMMARY

A system includes an input module configured to receive a data stream of encoded print data. The data stream includes image file data and a plurality of command operations, the encoded print data corresponds to a page of print data, and each of the command operations corresponds to at least one pixel in a line on the page of print data. An image file decoding module is configured to decode the image file data, store the decoded image file data in a first memory, and store, in the first memory, first identifiers identifying where the decoded image file data is stored. A print data decoding module is configured to receive the command operations and the identifiers, and generate decoded print data based on the command operations, the first identifiers, and the decoded image file data.

A method includes receiving a data stream of encoded print data, wherein the data stream includes image file data and a plurality of command operations, the encoded print data corresponds to a page of print data, and each of the command operations corresponds to at least one pixel in a line on the page of print data. The method further includes decoding the image file data, storing the decoded image file data in a first memory, storing, in the first memory, first identifiers identifying where the decoded image file data is stored, receiving the command operations and the identifiers, and generating decoded print data based on the command operations, the first identifiers, and the decoded image file data.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

A host and printer may implement a real-time rendering and decoding scheme to render image data (e.g., convert image data to raster data) for transmission from the host to the printer and decode the rendered image data (i.e., the raster data) for printing. For example only, the host may implement a rendering scheme with inherent compression as described in U.S. Pat. No. 7,880,750, which is hereby incorporated herein by reference in its entirety. At the host, the rendering scheme generates compressed data corresponding to a page of image data. The compressed data is serialized into a transmittable data stream and transmitted from the host to the printer. The printer decodes the data stream for printing (e.g., using a processor executing firmware and/or a decoder).

The data stream may include raster data including a plurality of command operations, each operating on one or more pixels (e.g., operations identifying positions of segments of pixels and respective colors or palette positions for the pixels), and image file data. For example, the image file data may include JPEG data. The decoder processes each operation in the data stream sequentially. The processor locates the JPEG data in the data stream and directs the JPEG data to an appropriate decoder (e.g., a JPEG decoder). Accordingly, the processor may be accessed multiple times during the decoding of a given data stream (e.g., each time the JPEG data appears in the data stream).

In a rendering and decoding system according to the present disclosure, identifiers corresponding to JPEG data in a line-based data stream are arranged before the command operations in the data stream. For example only, the identifiers may be stored in a table. The processor provides all or portions of the JPEG data to the JPEG decoder prior to any decoding being performed on the corresponding command operations. Accordingly, when the decoder decodes a command operation that corresponds to JPEG data, the JPEG data may already be provided to and decoded by the JPEG decoder. The decoder may retrieve the decoded JPEG data based on the identifiers stored in the table and access to the processor during decoding is minimized. Although the image file data is described as JPEG data, the principles and decoding system according to the present disclosure may be applied to other types of image file data (e.g., PNG data).

Figure 1:
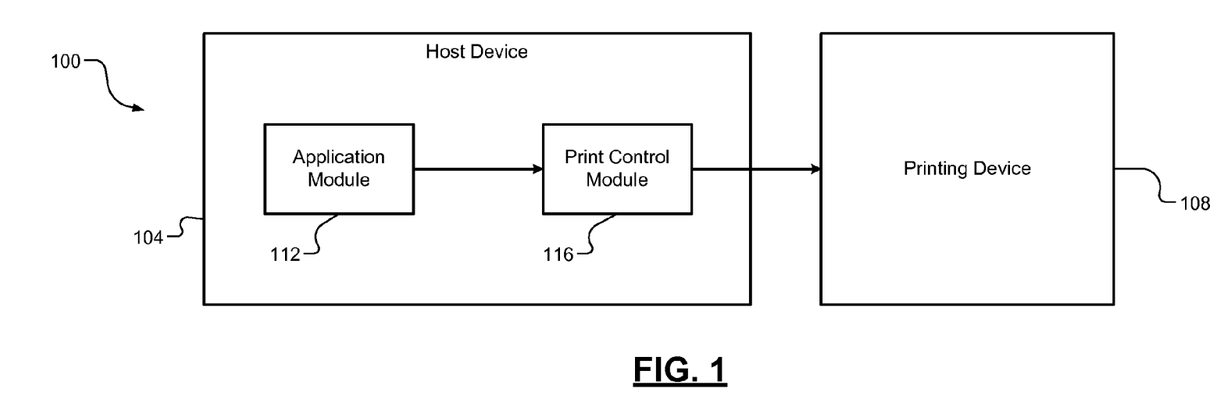
FIG. 1 is a rendering and decoding system according to the principles of the present disclosure.

Referring now to FIG. 1, a rendering and decoding system 100 includes a host device 104 and a printing device 108. The host device 104 includes an application module 112 and a print control module 116. The host device 104 may also include one or more additional devices (not shown) including, but not limited to, processors, memory, storage devices, and input/output devices.

The application module 112 may be any device, software program, or process that generates and/or outputs image data for printing. For example only, the application module 112 may be an operating system, Internet browser, graphics or photo editing program, or word processing program. The print control module 116 receives the image data from the application module 112 and encodes the image data (e.g., into raster data). For example, the print control module 116 may implement a printer driver that renders the raster data for transmission from the host device 104 to the printing device 108 according to the principles of the present disclosure. Rendering the raster data includes, for example, compressing the raster data.

The print control module 116 renders the raster data into a line-based data stream that includes line data blocks interleaved with image file data blocks (e.g., JPEG data). For example, the line-based data stream may correspond to one page of raster data, and may include a plurality of the line data blocks. Each of the line data blocks may correspond to command operations for one line of the page of raster data. The image file data corresponds to images that may appear in the page of raster data. Further, each of the line data blocks may include identifiers of a portion of the image file data that is associated with the line data block. For example, only a "stripe" of the image file data may appear on any given line of the page. Accordingly, the identifiers in the line data blocks each identify a particular stripe of image file data associated with the corresponding line. For example, the identifiers may include a unique identifier that corresponds to an image file (e.g., a JPEG file) that appears in the raster data, and a starting position (e.g., X/Y coordinates) in the image file. The printing device 108 (e.g., a processor of the printing device 108) correlates each identifier to an actual memory address.

The printing device 108 decodes the rendered raster data for printing. For example, the printing device 108 decodes the image file data independently of the other command operations for each line data block. While decoding the other command operations, the printing device 108 reinserts the already decoded image file data according to the identifiers of the image file data in the corresponding line data block.

Figure 2:
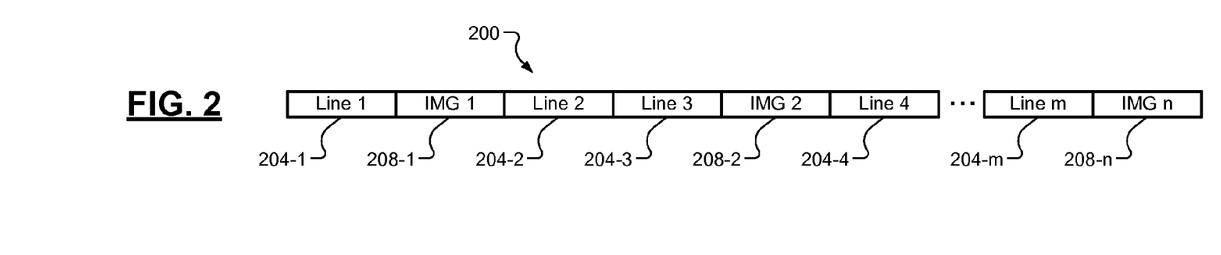
FIG. 2 is a line-based data stream according to the principles of the present disclosure.

Referring now to FIG. 2, the host device 100 transmits a line-based data stream 200 to the printing device 108. The data stream 200 corresponds to, for example only, a page of raster data including a plurality of line data blocks 204-1, 204-2, 204-3, 204-4, . . . , and 204-m, referred to collectively as line data blocks 204. Each of the line data blocks 204 may correspond to a single line of the page of raster data. The data stream 200 includes a plurality of image file data blocks 208-1, 208-2, . . . , and 208-n, referred to collectively as image file data blocks 208, interleaved with the line data blocks 204. Each image file data block 208 may correspond to image file data that will appear in a subsequent one of the line data blocks 204. For example only, the image file data block 208-1 may include image file data that, when decoded and/or printed, appears in a line of raster data corresponding to the line data block 204-2.

Figure 3:
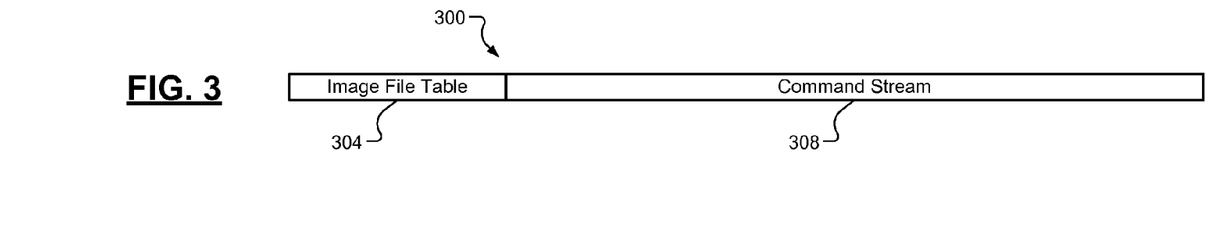
FIG. 3 is a line data block according to the principles of the present disclosure.

Referring now to FIG. 3, an example line data block 300 includes an image file table 304 and a command stream 308. The command stream 308 includes one or more hardware-readable command operations, each corresponding to one or more pixels associated with a given line of raster data. For example, each command operation may identify a position and/or length of a segment of pixels and a respective color or palette position for the segment of pixels. In other words, a command operation may indicate a span of a given number of pixels and a corresponding color to be used when printing a line of raster data including the pixels.

The image file table 304 may include the identifiers of portions of the image file data appearing in the command stream 308. For example, the image file table 304 may include a stripe identifier that identifies a stripe of pixels in a particular image file that corresponds to the command stream 308. Each identifier may also include an offset that corresponds to a relative offset with respect to a particular pixel in the image file. In this manner, each identifier identifies a stripe of pixels of a particular image file appearing on a line corresponding to the command stream 308.

Figure 4:
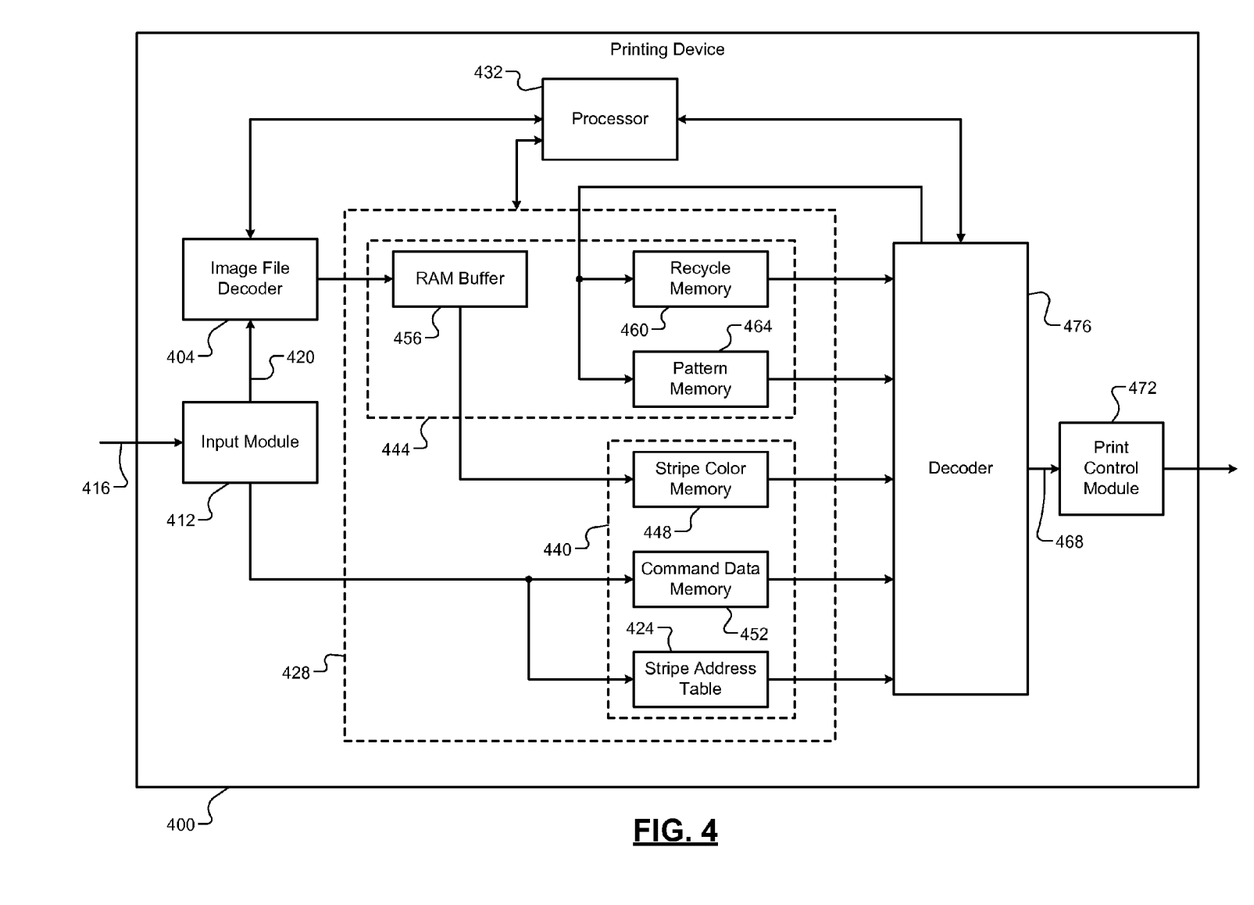
FIG. 4 is a printing device according to the principles of the present disclosure.

Referring now to FIG. 4, an example printing device 400 according to the principles of the present disclosure includes an image file decoding module 404 and a print data decoding module 408. The image file decoding module 404 receives image file data (e.g., independently of the command stream for each of the line data blocks) and decodes the image file data. Conversely, the print data decoding module 408 decodes the command stream and incorporates the decoded image file data into the print data.

For example, an input module 412 receives a line-based data stream 416 from a host device (e.g., the host device 104 as shown in FIG. 2). The input module 412 provides image file data 420 from the data stream 416 to the image file decoding module 404. The input module 412 may also provide an image file table 424 to the image file decoding module 404 or store the image file table in memory 428.

A processor 432 communicates with the image file decoding module 404 to facilitate the decoding of the image file data 420. For example only, the processor 432 may include the image file decoding module 404. If the data stream 416 includes the image file table 424, the processor 432 and/or the image file decoding module 404 translates each of the identifiers in the image file table 424 to an actual address. The actual address indicates where the corresponding stripe of image file data 420 is stored in the memory 428 after decoding. The image file table 424 is updated to include the actual address correlated to each of the identifiers (i.e., for each of the stripe identifier/offset pairs) and stored in the memory 428. If the data stream 416 does not include the image file table 424, the processor 432 searches the data stream 416 for references to the image file data 420 to generate and store the image file table 424.

For example, the image file table 424 may be implemented as a first in, first out (FIFO) memory. The processor 432 may load multiple addresses into the image file table 424 for a next line of raster data in the data stream 416. The addresses are then output from the image file table 424 in response to corresponding command operations in the data stream 416.

The memory 428 generally represents one or more types of memory and/or memory modules provided independently of one another or together on one or more integrated circuits. For example only, the memory 428 may include a main memory module 440 and a buffer memory module 444. The main memory module 440 stores the image file table 424, stripe color memory 448, and command data memory 452. The stripe color memory 448 stores decoded image file data in the addresses identified by the image file table 424. The command data memory 452 stores command operations corresponding to the data stream 416. For example only, the image file table 424, the stripe color memory 448, and the command data memory 452 correspond to direct memory access (DMA) locations in the main memory module 440 accessible by the print data decoding module 408.

The buffer memory module 444 includes a RAM buffer 456, a recycle memory 460, and a pattern memory 464. The RAM buffer 456 may receive and store the decoded image file data from the image file decoding module 404 and provide the decoded image file data to the stripe color memory 448. For example, the decoded image file data may include color data stored at corresponding addresses in the stripe color memory 448. The image file table 424 identifies a particular stripe of the image file data 420 and an offset, as well as the address of the decoded image file data in the stripe color memory 448. Accordingly, the color data stored in the stripe color memory 448 identifies a color for each stripe of image file data in the image file table 424.

The recycle memory 460 stores color data (e.g., corresponding to both the image file data 420 and the command operations) that has been previously used by the print data decoding module 408. When the print data decoding module 408 decodes print data (for a given line of the page of print data) corresponding to a particular color, the color and a length of a segment of pixels using the color are stored in the recycle memory 460. For example, the command operations for a particular line in the data stream 416 may instruct the print data decoding module 408 to store the color data for use in a subsequent line. If a subsequent command operation (e.g., a command operation for a subsequent line of the page of print data) uses the same color, the print data decoding module 408 may reuse the already decoded color data stored in recycle memory 460. For example, if the length of the segment using the color differs from the previous segment, then the print data decoding module 408 may reuse the color data but adjust the length of the segment. For example only, the recycle memory 460 includes first in first out (FIFO) memory.

The pattern memory 464 stores pattern data indicative of color patterns in lines previously decoded by the print data decoding module 408. For example, a color pattern may include two or more alternating colors of particular segment lengths. For fixed patterns having repeated colors and lengths, both the color data and length data may be stored in the pattern memory 464. Conversely, for certain image file data (e.g., JPEG data), the pattern memory 464 may store the lengths of the segments in the pattern, while the stripe color memory 448 stores the corresponding colors in the pattern. For example only, the pattern memory 464 includes first in first out (FIFO) memory.

The print data decoding module 408 generates decoded print data 468, which includes the decoded image file data, based on the command operations and the decoded image file data. For example, the print data decoding module 408 reads the data stream 416 according to the command operations stored in the command data memory 452 and the image file table 424. The decoded print data 468 includes the decoded image file data integrated with the remaining print data in the data stream 416. The decoded print data includes, for example, a plurality of colors and corresponding run lengths for each color. Each color and the corresponding run length is a segment of data.

The command operations include, but are not limited to, a draw command, a reset pattern command, a reset stripe command, and an offset stripe command. The printing device 400 generates output (e.g., raw raster pixels) based on a draw command, which indicates a run of pixels (i.e., a length of the segment) and a corresponding color. For a draw command, the print data decoding module 408 may obtain the data (e.g., color and length) for a given segment from one or more of the stripe color memory 448 (e.g., for image file data), the data stream 416 (e.g., for non-image file data embedded in the data stream, the recycle memory 460, and the pattern memory 464). The draw command may also indicate whether the resulting segment uses recycled color data. Accordingly, the draw command may indicate a source for the color output (e.g., the recycle memory 460, the pattern memory 464, the stripe color memory 448, and/or embedded in the data stream 416 immediately following the draw command), a source for the length of the color output (e.g., the recycle memory 460, the pattern memory 464, and/or embedded in the data stream 416 immediately following the draw command), and whether the resulting output is written back to the recycle memory 460. The resulting output may also be written to the pattern memory 464.

The reset pattern command deletes the pattern memory 464 and sets a new pattern length (i.e., stores data indicative of a new pattern in the pattern memory 464. The reset stripe command loads a next address (i.e., a new current address) from the image file table 424. For example, the new current address corresponds to the address in the stripe color memory 448 for the next draw command. After each draw command that uses a color from the stripe color memory 448, the reset stripe command may load the next address. The offset stripe command advances the current address by an offset (e.g., two or more addresses). For example, the offset may indicate a number of addresses in the stripe color memory 448 to skip.

The print data decoding module 408 provides the decoded print data 468 to a print control module 472 from a decoder 476. The print control module 472 includes one or more components (not shown) for printing according to the decoded print data 468 (e.g., a print head).

Figure 5:
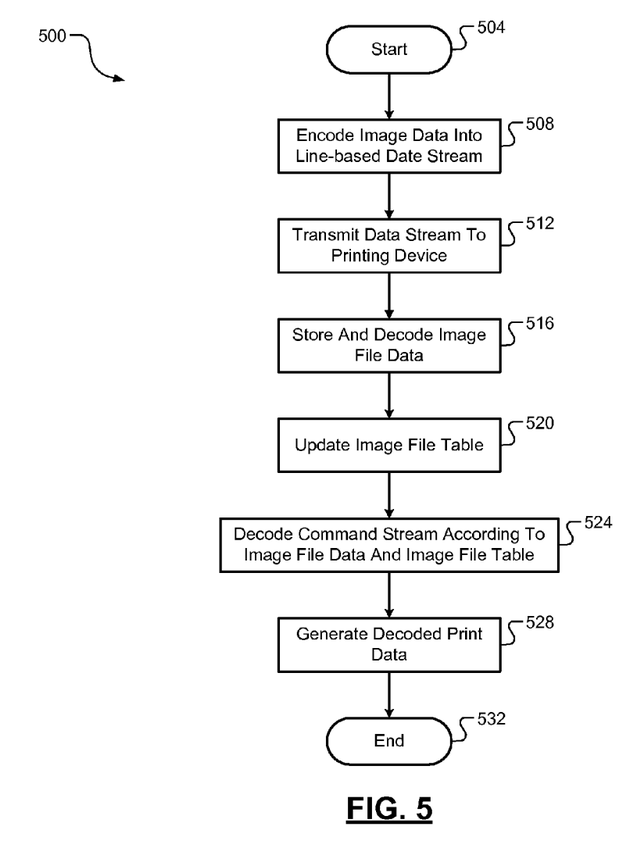
FIG. 5 illustrates a rendering and decoding method according to the principles of the present disclosure.

Referring now to FIG. 5, a rendering and decoding method 500 begins at 504. At 508, the method 500 encodes a page of raster data into a line-based data stream. The line-based data stream includes line data blocks interleaved with image file data. Each line data block may include an image file table and a command stream. At 512, the method 500 transmits the data stream to a printing device. At 516, the method 500 decodes the image file data and stores the decoded image file data. At 520, the method 500 updates the image file table to correlate identifiers of the image file data with respective addresses of the decoded image file data. At 524, the method 500 decodes the command stream according to the image file table and the stored decoded image file data. At 528 the method 500 generates decoded print data according to the command stream and the decoded image file data. The method 500 ends at 532.

In another implementation of the principles of the present disclosure, a rendering and decoding system provides a modified escape operation. For example, a command stream of the rendering scheme as described in U.S. Pat. No. 7,880,750 includes command operations including, but not limited to, runs, straights, escapes, and end-of-line (EOL). Escapes and EOL operations correspond generally to a state of a decoder.

Conversely, runs and straights directly correspond to raster output. The processing performed by the decoder during any run or straight operations depends on a current state of the decoder as determined by escape operations. The decoder may use a function look-up table for each command value (i.e., a specific value corresponding to each command). The decoder may modify the set of functions in the table as required. Accordingly, a simple loop can be implemented to process each command individually and a state machine controlling the state of the decoder is not hardwired into code.

Each output operation (i.e., the run and straight operations) therefore results in a separate output command to generate output pixels corresponding to the operation. Run operations are often grouped together with no other intervening operation types or escapes that would change the state of the decoder. Accordingly, if the decoder receives an indication of the grouping of the run operations, the run operations can be processed as a group rather than being processed individually.

Figure 6:
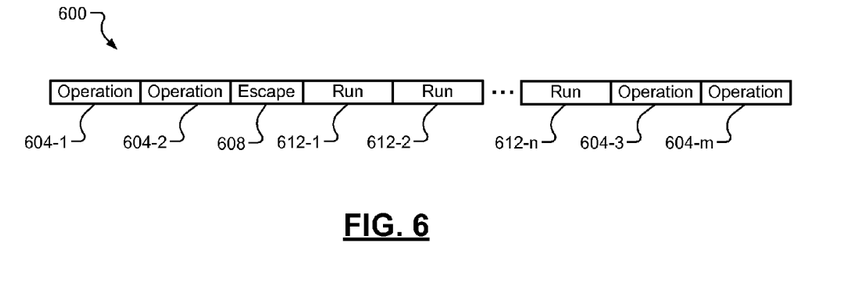
FIG. 6 is a command stream including a modified escape operation according to the principles of the present disclosure.

Referring now to FIG. 6, an example command stream 600 includes operations 604-1, 604-2, 604-3, . . . , and 604-*m*, referred to collectively as operations 604. The operations 604 may include straight, run, escape, and EOL operations. A modified escape operation 608 is followed by a plurality of run operations 612-1, 612-2, . . . , 6-12-*n*, referred to collectively as run operations 612. The run operations 612 correspond to a plurality of consecutive run operations that do not change a state of the decoder. The modified escape operation 608 indicates a number of the run operations 612 that follow the modified escape operation 608.

Accordingly, the decoder determines number of the consecutive run operations 612 based on the modified escape operation 608. The decoder may implement an internal loop to process the run operations 612 as a group. For example only, the decoder may assume that a color source is the same for each of the run operations 612 since there are no intervening state changes within the consecutive run operations 612. Conversely, if the decoder is not configured to implement the internal loop, the decoder may continue to process each of the run operations 612 individually.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system, comprising:
   an input module configured to receive a data stream of encoded print data, wherein (i) the data stream includes image file data and a plurality of command operations, (ii) the encoded print data corresponds to a page of print data, and (iii) each of the command operations corresponds to at least one pixel in a line on the page of print data;
   an image file decoding module configured to (i) decode the image file data, (ii) store the decoded image file data in a first memory, and (iii) store, in the first memory, first identifiers identifying where the decoded image file data is stored; and
   a print data decoding module configured to (i) receive the command operations and the identifiers, and (ii) generate decoded print data based on the command operations, the first identifiers, and the decoded image file data,
   wherein the image file decoding module is configured to decode the image file data and store the decoded image file data in the first memory prior to the print data decoding module performing decoding on command operations corresponding to the image file data.

2. The system of claim 1, wherein the encoded print data includes an image file table, wherein the image file table includes second identifiers identifying a stripe of the image file data corresponding to a subsequent one of the command operations.

3. The system of claim 1, wherein the input module is configured to (i) remove the image file data from the data stream, (ii) provide the image file data to the image file decoding module independent of the command operations, and (iii) provide the command operations to the print data decoding module independent of the image file data.

4. The system of claim 1, further comprising a printing device that includes the input module, the image file decoding module, and the print data decoding module.

5. The system of claim 4, further comprising a host device that includes a print control module, wherein the print control module is configured to (i) encode image data to generate the encoded print data, and (ii) transmit the data stream to the printing device.

6. The system of claim 1, wherein the image file data includes JPEG data.

7. A system, comprising:
   an input module configured to receive a data stream of encoded print data, wherein (i) the data stream includes image file data and a plurality of command operations, (ii) the encoded print data corresponds to a page of print data, and (iii) each of the command operations corresponds to at least one pixel in a line on the page of print data;
an image file decoding module configured to (i) decode the image file data, (ii) store the decoded image file data in a first memory, and (iii) store, in the first memory, first identifiers identifying where the decoded image file data is stored; and
a print data decoding module configured to (i) receive the command operations and the identifiers, and (ii) generate decoded print data based on the command operations, the first identifiers, and the decoded image file data,
wherein the encoded print data includes an image file table, wherein the image file table includes second identifiers identifying a stripe of the image file data corresponding to a subsequent one of the command operations, and
wherein the image file decoding module updates the image file table to include the first identifiers after the image file data is decoded.

8. The system of claim 7, wherein the image file table correlates the second identifiers with respective ones of the first identifiers.

9. A system, comprising:
an input module configured to receive a data stream of encoded print data, wherein (i) the data stream includes image file data and a plurality of command operations, (ii) the encoded print data corresponds to a page of print data, and (iii) each of the command operations corresponds to at least one pixel in a line on the page of print data;
an image file decoding module configured to (i) decode the image file data, (ii) store the decoded image file data in a first memory, and (iii) store, in the first memory, first identifiers identifying where the decoded image file data is stored; and
a print data decoding module configured to (i) receive the command operations and the identifiers, and (ii) generate decoded print data based on the command operations, the first identifiers, and the decoded image file data,
wherein (i) the first identifiers include addresses of the first memory where the decoded image file data is stored, and (ii) the print data decoding module is configured to retrieve the decoded image file data from the first memory in response to the command operations based on the addresses.

10. A system, comprising:
an input module configured to receive a data stream of encoded print data, wherein (i) the data stream includes image file data and a plurality of command operations, (ii) the encoded print data corresponds to a page of print data, and (iii) each of the command operations corresponds to at least one pixel in a line on the page of print data;
an image file decoding module configured to (i) decode the image file data, (ii) store the decoded image file data in a first memory, and (iii) store, in the first memory, first identifiers identifying where the decoded image file data is stored;
a print data decoding module configured to (i) receive the command operations and the identifiers, and (ii) generate decoded print data based on the command operations, the first identifiers, and the decoded image file data; and
a recycle memory configured to store decoded color data corresponding to a previously decoded line of the encoded print data.

11. A system, comprising:
an input module configured to receive a data stream of encoded print data, wherein (i) the data stream includes image file data and a plurality of command operations, (ii) the encoded print data corresponds to a page of print data, and (iii) each of the command operations corresponds to at least one pixel in a line on the page of print data;
an image file decoding module configured to (i) decode the image file data, (ii) store the decoded image file data in a first memory, and (iii) store, in the first memory, first identifiers identifying where the decoded image file data is stored;
a print data decoding module configured to (i) receive the command operations and the identifiers, and (ii) generate decoded print data based on the command operations, the first identifiers, and the decoded image file data; and
a pattern memory configured to store pattern data corresponding to a previously decoded line of the encoded print data.

12. A method, comprising:
receiving a data stream of encoded print data, wherein (i) the data stream includes image file data and a plurality of command operations, (ii) the encoded print data corresponds to a page of print data, and (iii) each of the command operations corresponds to at least one pixel in a line on the page of print data;
decoding the image file data;
storing the decoded image file data in a first memory;
storing, in the first memory, first identifiers identifying where the decoded image file data is stored;
receiving the command operations and the identifiers; and
generating decoded print data based on the command operations, the first identifiers, and the decoded image file data,
wherein decoding the image file data and storing the decoded image file data in the first memory are performed prior to performing any decoding being performed on command operations corresponding to the image file data.

13. The method of claim 12, wherein the encoded print data includes an image file table, wherein the image file table includes second identifiers identifying a stripe of the image file data corresponding to a subsequent one of the command operations.

14. The method of claim 13, further comprising updating the image file table to include the first identifiers after the image file data is decoded.

15. The method of claim 14, wherein the image file table correlates the second identifiers with respective ones of the first identifiers.

16. The method of claim 12, further comprising:
removing the image file data from the data stream;
providing the image file data to the image file decoding module independent of the command operations; and
providing the command operations to the print data decoding module independent of the image file data.

17. The method of claim 12, further comprising:
encoding image data to generate the encoded print data; and
transmitting the data stream to a printing device.

18. The method of claim 12, further comprising, using a recycle memory, storing decoded color data corresponding to a previously decoded line of the encoded print data.

19. The method of claim 12, further comprising, using a pattern memory, storing pattern data corresponding to a previously decoded line of the encoded print data.

20. The method of claim 12, wherein the image file data includes JPEG data.

21. A method, comprising:
- receiving a data stream of encoded print data, wherein (i) the data stream includes image file data and a plurality of command operations, (ii) the encoded print data corresponds to a page of print data, and (iii) each of the command operations corresponds to at least one pixel in a line on the page of print data;
- decoding the image file data;
- storing the decoded image file data in a first memory;
- storing, in the first memory, first identifiers identifying where the decoded image file data is stored;
- receiving the command operations and the identifiers; and
- generating decoded print data based on the command operations, the first identifiers, and the decoded image file data,
- wherein (i) the first identifiers include addresses of the first memory where the decoded image file data is stored, and (ii) the print data decoding module is configured to retrieve the decoded image file data from the first memory in response to the command operations based on the addresses.

* * * * *